United States Patent [19]

Rader

[11] Patent Number: 5,122,786

[45] Date of Patent: Jun. 16, 1992

[54] ERGONOMIC KEYPADS FOR DESKTOP AND ARMREST APPLICATIONS

[76] Inventor: Freeman Rader, #38 Grant Ave., Manitou Springs, Colo. 80829

[21] Appl. No.: 544,757

[22] Filed: Jun. 27, 1990

[51] Int. Cl.⁵ ............................. G09G 3/07; B41J 5/08
[52] U.S. Cl. ................................... 340/711; 340/706; 340/710; 400/489; 400/492; 400/478; 248/917; 248/918; 297/115; 341/22
[58] Field of Search ............... 400/489, 492, 715, 495, 400/473, 478; 341/22; 340/706, 711, 710, 709; 312/208; 248/918, 917; 297/115

[56] References Cited

U.S. PATENT DOCUMENTS

| | | | |
|---|---|---|---|
| 3,929,216 | 12/1975 | Einbinder | 400/492 |
| 3,990,565 | 11/1976 | Felton et al. | 197/98 |
| 4,244,659 | 1/1981 | Malt | 400/486 |
| 4,378,553 | 3/1983 | McCall | 340/365 R |
| 4,509,873 | 4/1985 | Ryan | 400/489 |
| 4,579,470 | 4/1986 | Casey | 400/489 |
| 4,597,681 | 7/1986 | Hodges | 400/488 |
| 4,661,005 | 4/1987 | Lahr | 400/489 |
| 4,669,903 | 6/1987 | Herzog et al. | 400/489 |
| 4,824,268 | 4/1989 | Diernisse | 400/486 |
| 4,891,632 | 1/1990 | Chang | 340/710 |
| 4,917,516 | 4/1990 | Retter | 400/489 |
| 4,971,465 | 11/1990 | Hashimoto | 400/489 |

FOREIGN PATENT DOCUMENTS 575186 4/1958 Italy.

OTHER PUBLICATIONS

J. Greenfield and R. D. Wysong, Keyboard Assembly, Jan. 1983, IBM Technical Disclosure Bulletin, vol. 25, No. 8, pp. 4265-4267.
D. L. Conway, Contoured Keyboard, Aug. 1979, IBM Technical Disclosure Bulletin, vol. 22, No. 3, pp. 1276-1277.
A. Uchiyama, Kana Keyboard with Palm Rest, Feb. 1983, IBM Technical Disclosure Bulletin, vol. 25, No. 9. pp. 4915-4916.
D. L. Conway, Digital "X" Typewriter Keyboard, IBM Technical Disclosure Bulletin, vol. 18, No. 12, May 1976, pp. 4187-4190.

Primary Examiner—Alvin E. Oberley
Assistant Examiner—Amare Mengistu
Attorney, Agent, or Firm—William E. Hein

[57] ABSTRACT

A pair of left and right ergonomic keypads may be separately positioned on a desktop or in the armrests of a chair to permit the user to operate the keypads while assuming more comfortable and natural hand and wrist positions than required when using prior art slab keyboards. The separate keypads may be hingedly, interlockingly joined to function as a compact unitary keyboard for desktop use. When so joined for desktop use, the keypads may be rotated about a point of attachment to any desired position from an open position to a closed position. When in the closed position, the keypads form a compact, diamond-shaped unitary keyboard providing improved portability. Whether employed in a desktop or an armrest application, the keypads may be adjusted to any angle that the user finds most comfortable and convenient for operation. Individual keys are arranged to provide an ergonomically sound home position for each of the user's hands from which a maximum number of keys and control devices may be reached without moving the hands from their home positions. Keys are located on the top surface of the keypads, and additional keys and/or cursor control devices are located on the vertical front surface of each of the keypads for actuation by the user's thumbs.

6 Claims, 7 Drawing Sheets

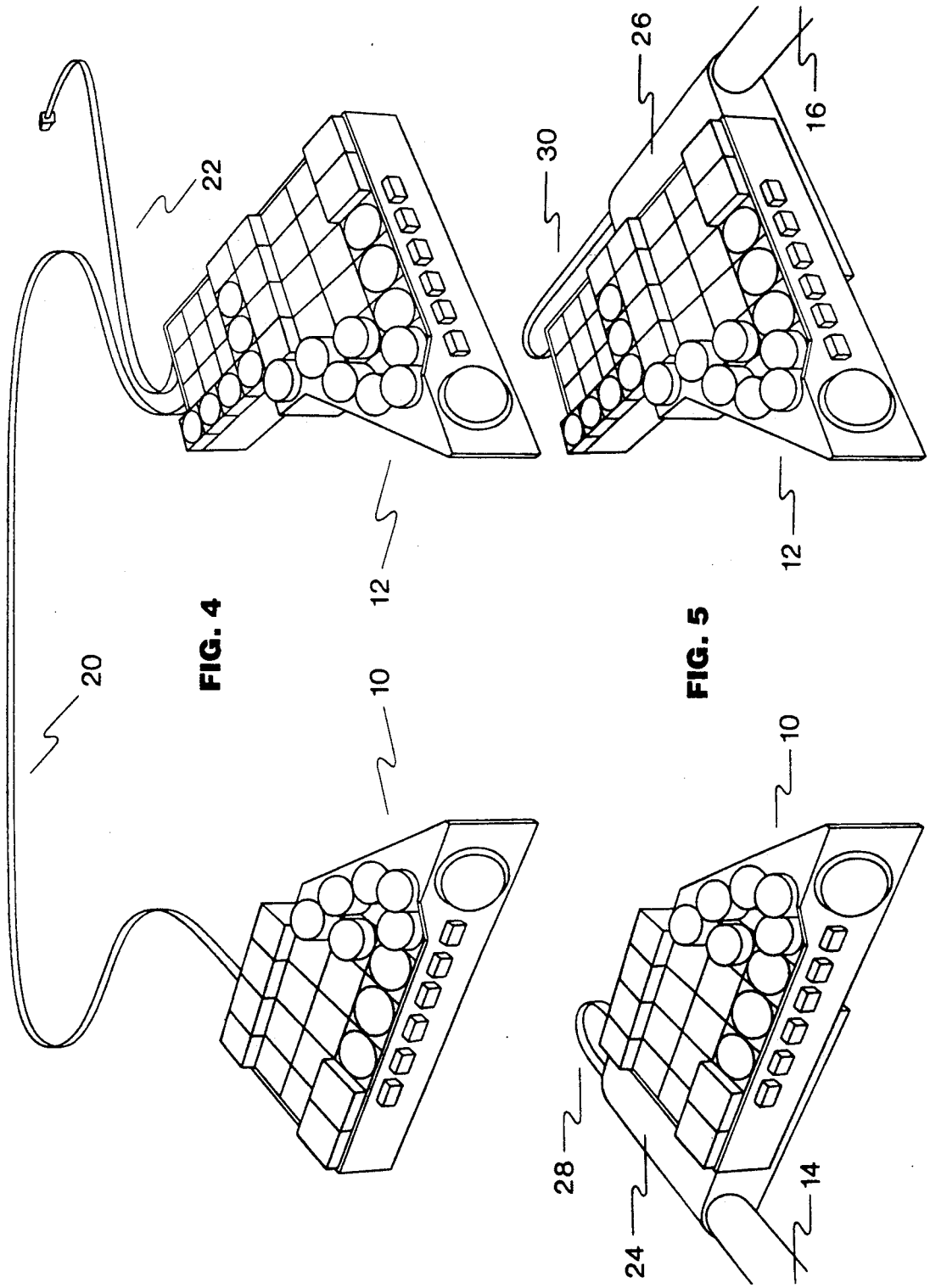

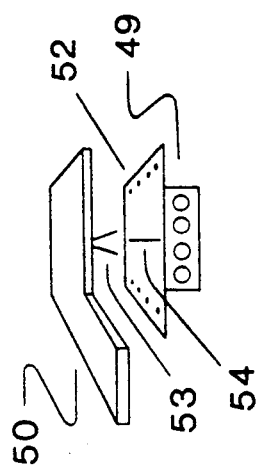
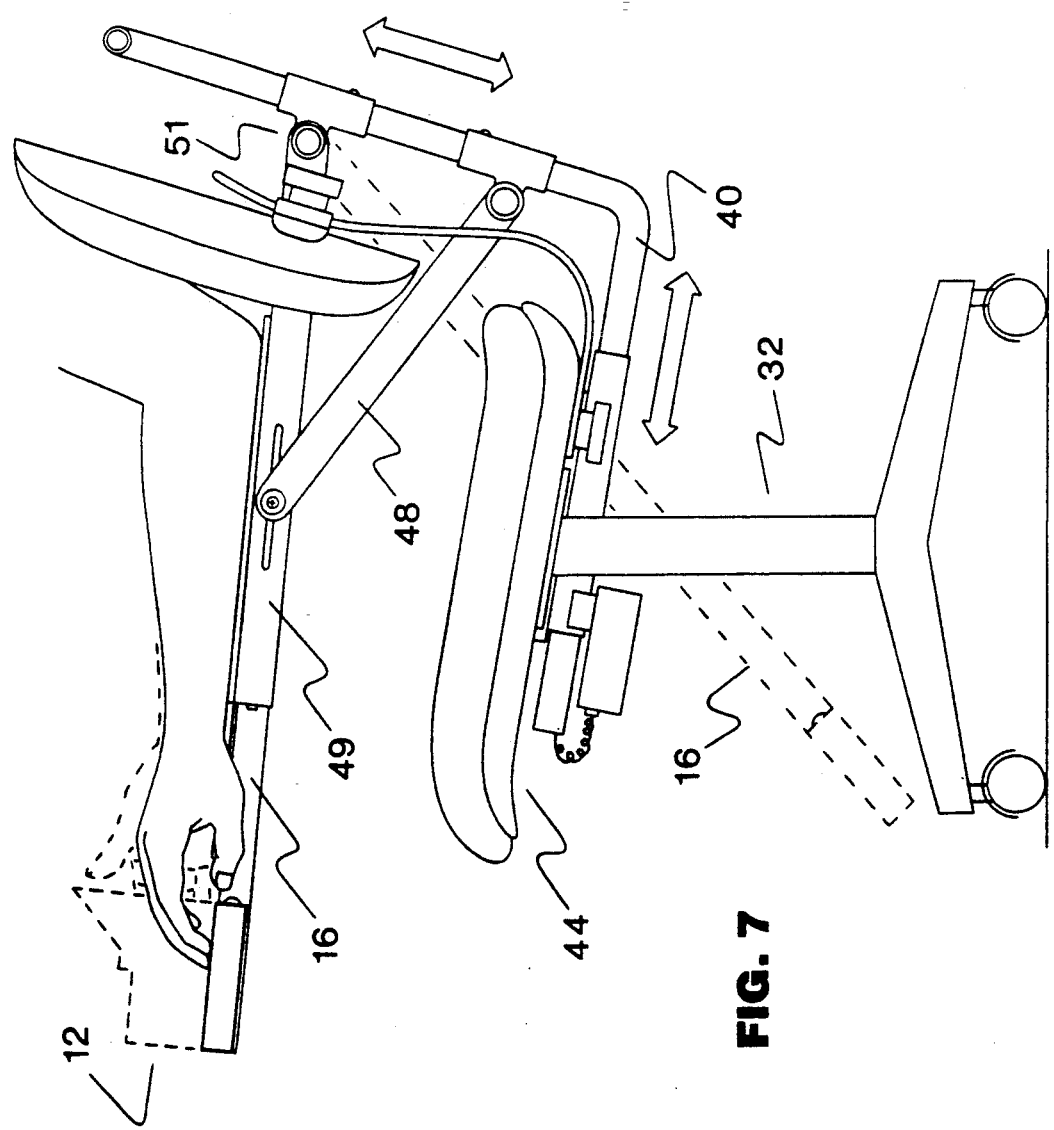

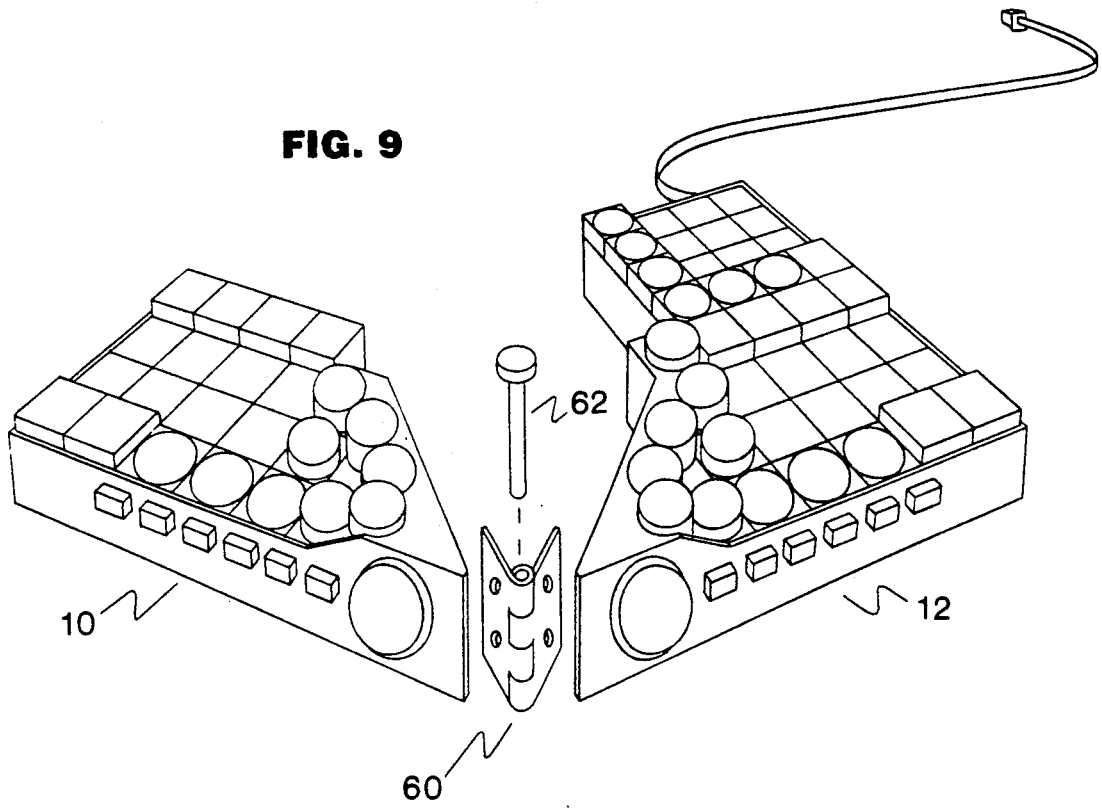
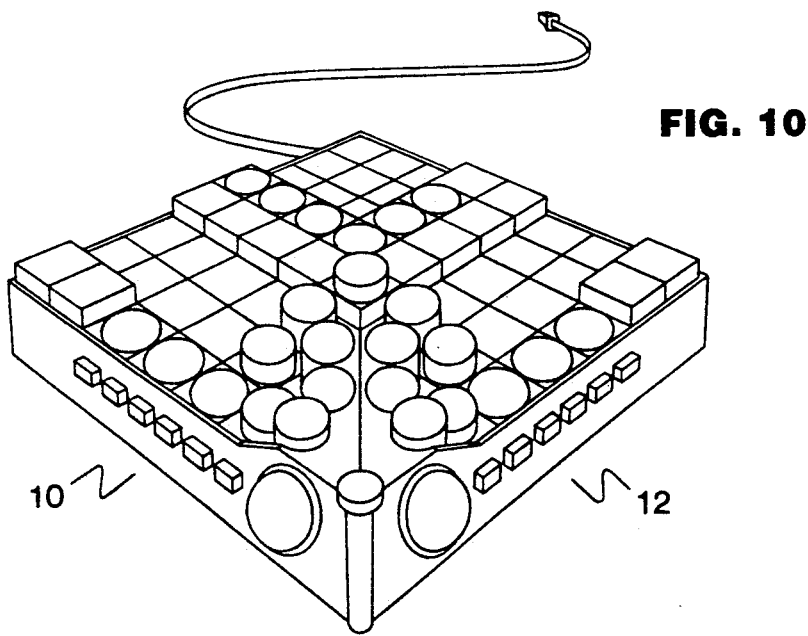

ERGONOMIC KEYPADS FOR DESKTOP AND ARMREST APPLICATIONS

BACKGROUND AND SUMMARY OF THE INVENTION

This invention relates generally to keyboards and more specifically to separate ergonomic keypads that are designed for respective right hand and left hand use. The separate keypads may be positioned by the user in a way that affords maximum ergonomic comfortability and versatility.

Most prior art keyboards, such as those commonly employed in the computer industry as input devices, for example, are one-piece slab keyboards that have a plurality of horizontally positioned rows of keys arranged in groups. These groups typically include a number of alphabetic, numeric, and control keys arranged much as they would be on a conventional QWERTY typewriter. In addition, other groups may include function or soft keys, cursor control keys, editing keys, and numeric entry keys, the latter group being arranged as they would be on an adding machine. Users of these types of slab keyboards are at risk of becoming afflicted with a serious tendon disease known as carpal tunnel syndrome. This disease is the long term result of irritation and inflammation of the median nerve that is caused by maintaining the fingers, hands, wrists, and arms in the unnatural positions required to operate these prior art slab keyboards. There have been attempts in the prior art to redesign these slab keyboards to allow users to assume more natural wrist and hand positions during operation. One such keyboard is hinged in the form of an inverted V. Another has keys positioned at a fixed angle. Another has attempted to provide keys that can be actuated by the thumbs of the user. However, no known keyboard provides for autonomous positioning and for complete variable adjustment in all planes or for optimum ergonomic key arrangement. Neither do any of the prior art keyboards provide for ergonomic application in the armrests of a chair.

It is therefore a principal object of the present invention to provide a pair of ergonomic keypads that may be individually positioned on a desktop or the armrests of a chair so as to permit the user to operate the keypads while assuming more comfortable and natural hand and wrist positions than is possible when using keyboards constructed in accordance with the prior art. A further object of the present invention is to provide a pair of ergonomic keypads that allow full adjustability in both the horizontal and vertical planes to permit a selection by the user of the most comfortable hand and wrist positions. A further object of the present invention is to provide a pair of ergonomic keypads that permit full use of the user's thumbs and optimum access to all keys from an ergonomically focused home position for each hand. A further object of the present invention is to provide a pair of ergonomic keypads that may be joined to form a compact, diamond-shaped keyboard unit for improved portability. A further object of the present invention is to provide a pair of ergonomic keypads in which various groups of keys are positioned at different heights to provide tactile feedback to the user as an aid in locating, by touch, the home position for each hand, as well as the particular keys to be actuated. Positioning the keys at different heights provides a differentiating feature for those keys intended to be actuated by the user's thumbs and prevents actuation of more than one key at a time. A further object of the present invention is to provide a pair of ergonomic keypads on which the keys are arranged in a unique and more logical manner than on prior art keyboards, thereby accommodating forward and backward finger and hand movement to select various keys with lateral movement being accommodated through expanded thumb usage. A further object of the present invention is to provide a pair of ergonomic keypads that may mounted in the armrests of a chair so that the user may operate the keypads while comfortably seated with one's forearms supported by an armrest pad.

These and other objects are accomplished in accordance with the illustrated preferred embodiment of the present invention by employing separate left and right keypads that may be independently positioned on a desktop. The separate keypads may be mounted in the armrests of a chair or hingedly joined to function as a compact unitary keyboard for desktop use and for improved portability. The user may adjust the keypads to any desired position. Individual keys are arranged to provide an ergonomically sound home position for each hand from which a maximum number of keys and control devices may be reached without moving the hands from their home positions. The joined keypads may be adjusted to a closed position to form a compact, diamond-shaped unitary keyboard providing improved portability.

BRIEF DESCRIPTION OF THE DRAWINGS

FIG. 4 is a pictorial representation of the separate left and right keypads of FIG. 1 illustrating the way in which they may be separately positioned on a desktop.

FIG. 5 is a pictorial representation of the separate left and right keypads of FIG. 4 illustrating an armrest adaptor assembly for mounting each of them in the armrests of a chair.

FIG. 7 is a side elevation view of the armrest adaptor assembly of FIG. 6 illustrating its attachment to the right side of a chair.

FIG. 8 is a diagram illustrating the way in which the sliding armrest pad of FIG. 7 is mounted on the armrest of FIG. 7 to achieve a sliding back and forth motion.

FIG. 9 is a pictorial illustration of the way in which the separate left and right keypads of FIG. 4 may be hingedly joined to provide an adjustable unitary keyboard.

FIG. 10 is a pictorial representation of the joined left and right keypads of FIG. 9 in the fully closed interlocking position.

DETAILED DESCRIPTION OF THE INVENTION

Figure 1:
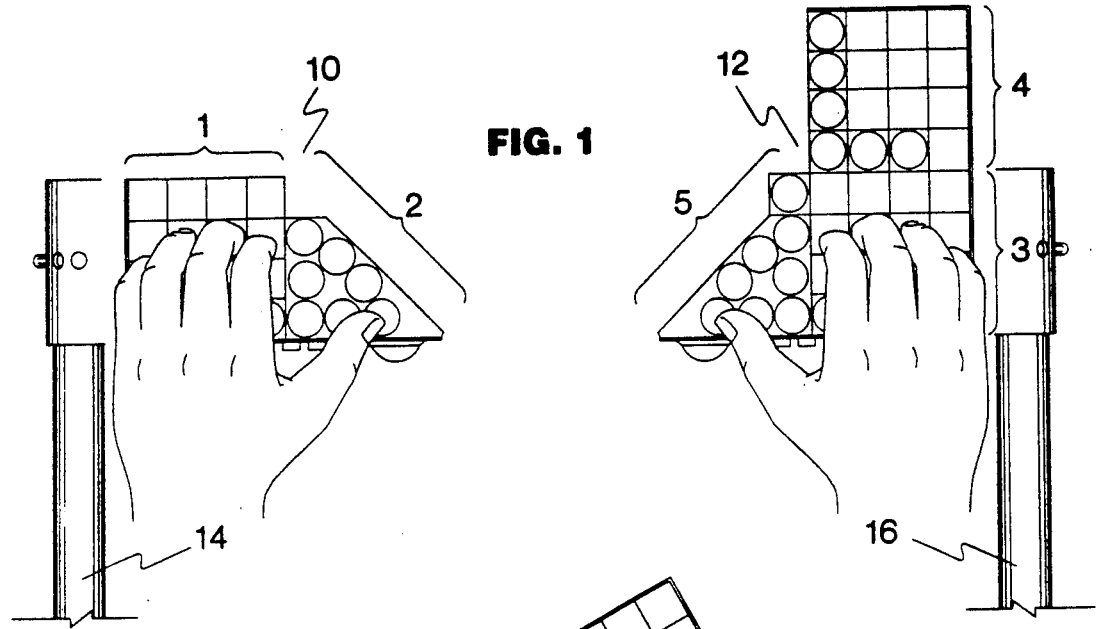
FIG. 1 is a plan view of separate left and right keypads constructed in accordance with the present invention illustrating their use in the armrests of a chair.
Figure 2:
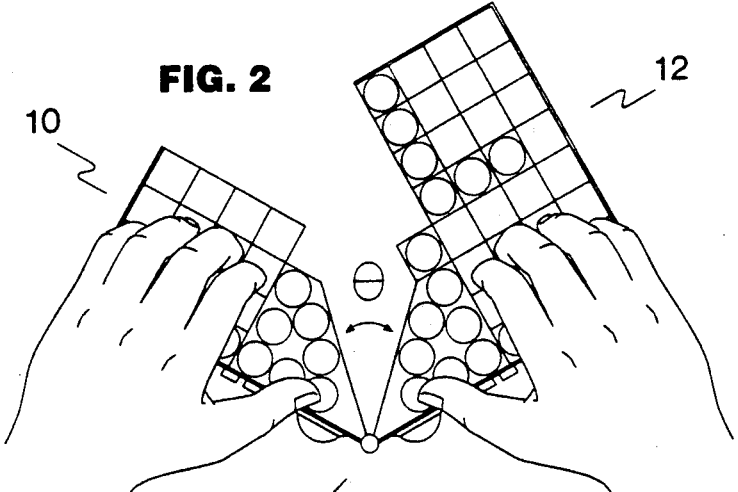
FIG. 2 is a plan view of the left and right keypads of FIG. 1 illustrating the way in which they may be joined at an adjustable angle.
Figure 3:
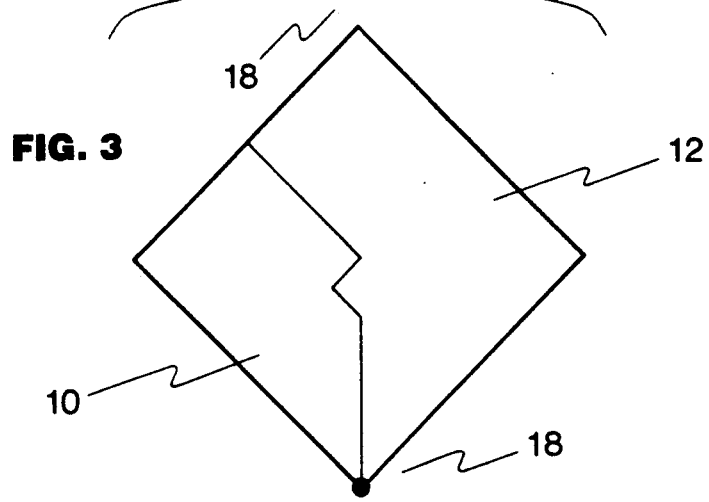
FIG. 3 is a plan view of the left and right keypads of FIGS. 1 and 2 illustrating them joined and in a closed interlocking position to form a compact unitary, diamond-shaped keyboard.

Referring now to FIG. 1, separate left and right keypads 10, 12 are mounted to left and right keypad support arms 14, 16. Left keypad 10 includes four rows and four columns of keys on the top surface thereof forming a rectangular matrix 1 of sixteen keys adapted primarily for actuation by the fingers of the user's left hand from the home position in which the hand is illustrated. To the right of the rectangular matrix 1 is a rightward pointed protrusion 2 having a plurality of keys on the top surface thereof arranged radially for actuation by the user's left thumb. Similarly, right keypad 12 includes four rows and four columns of keys on the top surface thereof forming a rectangular matrix 3 of sixteen keys adapted primarily for actuation by the fingers of the user's right hand from the home position in which the hand is illustrated. An additional four rows and four columns of keys positioned rearward of rectangular matrix 3 forms another rectangular maxtrix 4 of sixteen keys also adapted for actuation by the fingers and thumb of the user's right hand by sliding the hand directly forward from the home position illustrated. To the left of the rectangular matrix 3 is a leftward pointed protrusion 5 having a plurality of keys on the top surface thereof arranged radially for actuation by the user's right thumb. As shown in FIG. 2, the left and right keypads, 10, 12 may be hingedly joined at a point 18 for desktop use. A horizontal angle theta between the keypads 10, 12 may be adjusted as required to position keypads 10, 12 so that the user's hands and arms may assume their most comfortable and natural positions during operation. When the angle theta between the keypads 10, 12 of FIG. 2 is adjusted to zero, the keypads 10, 12 appear in a closed interlocking position illustrated in FIG. 3 to form a compact unitary, diamond-shaped keyboard for optimum portability. The separate left and right keypads 10, 12 may be remotely positioned as desired by the user for operation on a desktop, as illustrated in FIG. 4. A plug-in interconnect cable 20 connects the keypads 10, 12 and another plug-in cable 22 serves to electrically connect the keypads 10, 12 to a computer or other electronic equipment with which the keypads 10, 12 are employed.

Figure 6:
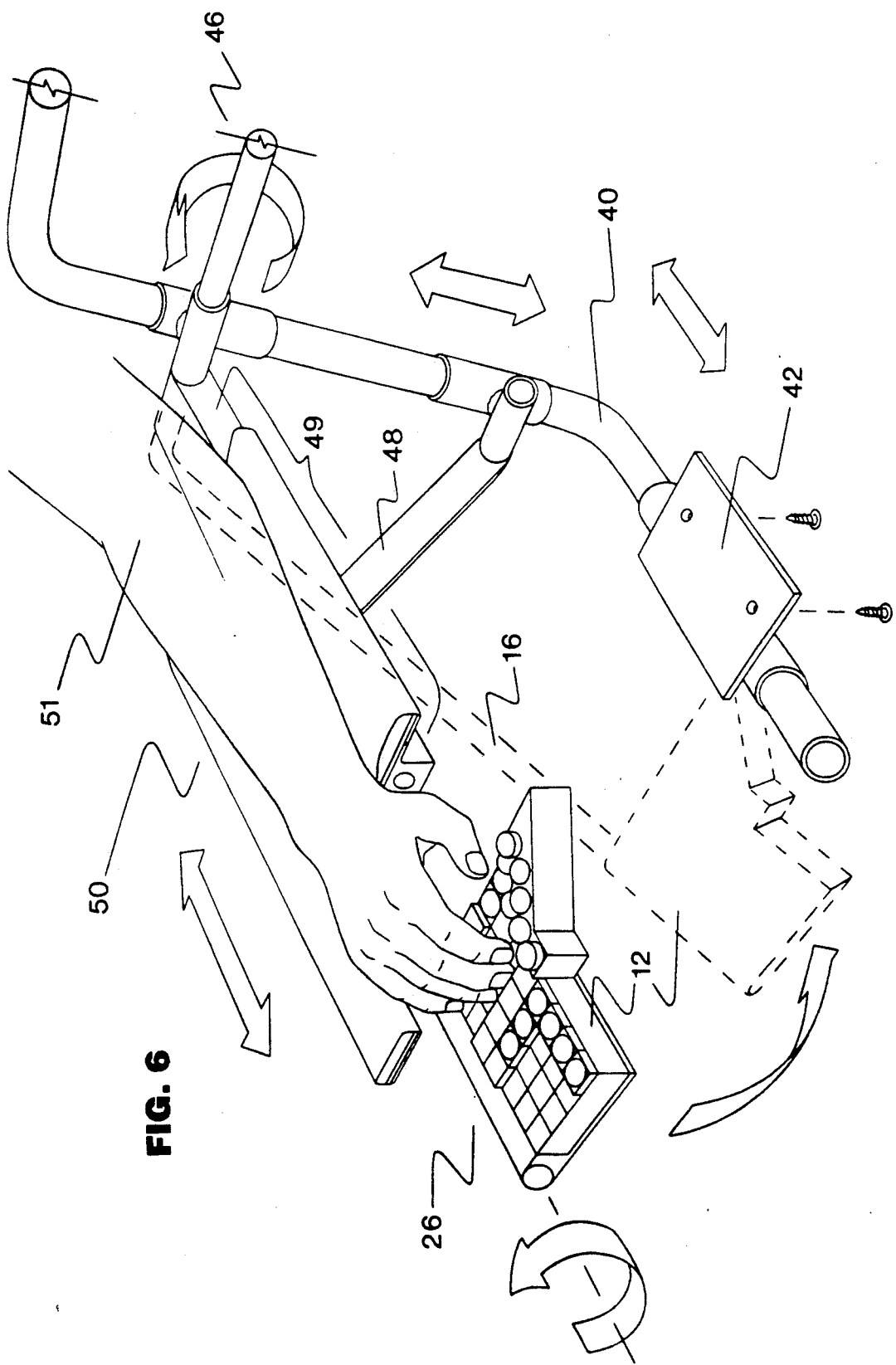
FIG. 6 is a detailed pictorial representation of the armrest adaptor assembly of FIG. 5 that is employed for receiving each of the separate left and right keypads of FIG. 4 for armrest applications.

When used in an armrest application, as illustrated in FIGS. 1 and 5 the left and right keypads 10, 12 are coupled to armrest keypad support arms 14, 16 by means of left and right armrest adaptors 24, 26. Electrical interconnect cables 28, 30 may be routed inside armrest keypad support arms 14, 16 so as not to interfere with operation of keypads 10, 12. As illustrated in detail in FIGS. 6-8, an armrest adaptor assembly is provided for mounting the left and right keypads 10, 12 to a conventional chair 32. For simplicity of illustration only the right keypad 12 has been shown. However, the left keypad may be mounted to chair 32 using an armrest assembly that is the mirror image of the armrest assembly illustrated in connection with right keypad 12. A tubular vertical frame member 40 is connected to a mounting plate 42 that is in turn attached under a seat 44 of chair 32. An armrest support member 48 is attached to vertical frame member 40 to support an armrest 49, atop which a sliding armrest pad 50 is adjustably positioned by armrest pad 50 sliding back and forth on a bearing surface 52 and held in place by an expanding fin 53 on the bottom surface of armrest pad 50 which is inserted into slot 54 on armrest 49. A horizontal tubular frame member 46 is adjustably attached to vertical frame member 40. A forward extending portion of frame member 46 forming a keypad support arm 16 receives armrest adaptor 26, which in turn receives right keypad 12. Keypad 12 is thus supported forward of armrest pad 50 for operation by the user while his or her forearm is comfortably positioned on armrest pad 50. Armrest 49, frame member 46, and keypad 12 are adapted for adjustment in the directions illustrated. Thus, these structural members may be positioned with respect to each other as desired by the user in order that the user may maintain the most comfortable and natural hand and arm positions while operating keypad 12. When not in use, keypad 12, adapted to keypad support arm 16, may be fully retracted downward and out the way of the user. Armrest 49 is concentrically mounted on tubular frame member 46 so that armrest 49 and keypad support arm 16 share a common pivot point 51. This feature ensures that regardless of how armrest 49 and keypad support arm 16 are independently adjusted, proper alignment with respect to each other is always maintained.

Left and right keypads 10, 12 may be hingedly joined for desktop use, as described above in connection with FIGS. 2 and 3. The way in which keypads 10, 12 are joined is illustrated in FIGS. 9 and 10. A hinge 60 serves to attach keypads 10, 12 at their inside front corners, thus forming a single pivot point. A removable hinge pin 62 facilitates the separation and joining of keypads 10, 12.

Figure 11A:
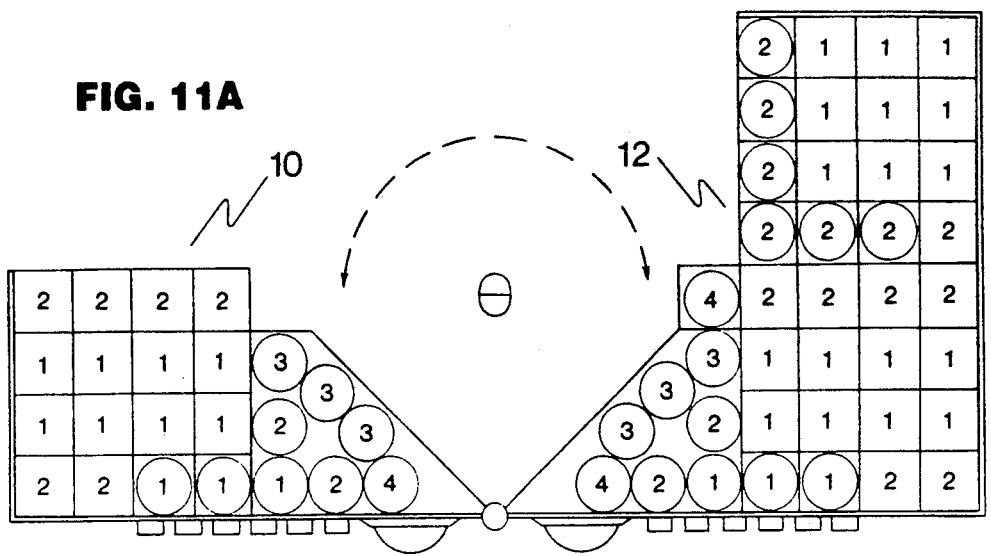
FIG. 11A is a plan view of the joined left and right keypads of FIG. 9 in which a plurality of finger actuated keys are illustrated as square key elements and a plurality of thumb actuated keys are illustrated as circular key elements and in which four different key heights are indicated by numbers within the key elements.
Figure 11B:
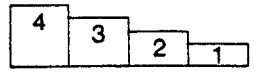
FIG. 11B is a pictorial representation of the different heights of the keys illustrated in the plan view of the left and right keypads of FIG. 11A.
Figure 12:
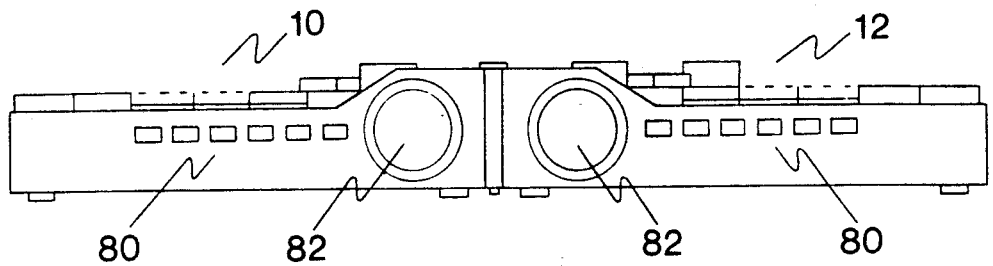
FIG. 12 is a front elevation view of the joined left and right keypads of FIG. 11 illustrating the four different key heights and the additional keys and control devices that may be mounted on the front vertical faces of the keypads.
Figure 13:
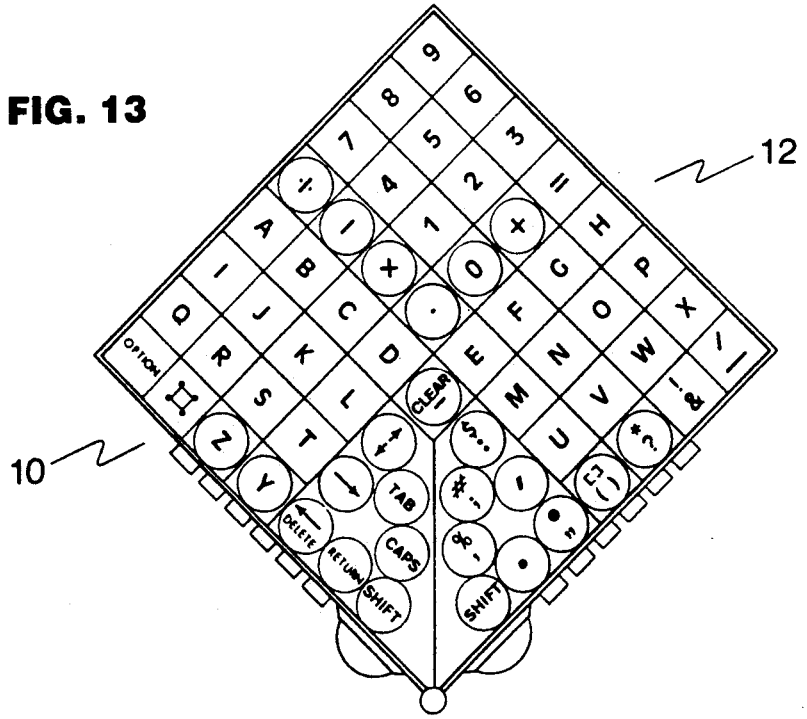
FIG. 13 is a plan view of the left and right keypads joined and in the closed interlocking position as in FIG. 3 illustrating an arrangement of keys to accommodate alphabetic, numeric, and other functions.

Referring now to FIGS. 11A-B, keypads 10, 12 are illustrated in the joined configuration. FIG. 11A shows the keypads 10, 12 in their fully open position in which the horizontal angle theta is at its maximum. The keys that are positioned on the top surface of keypads 10, 12 are illustrated to be at four different discrete heights, with those numbered 1 being lowest and those number 4 being highest, as illustrated in FIG. 11B. Additional keys 80 and cursor control devices 82 are illustrated in FIG. 12 as being positioned on the vertical front face of each of keypads 10, 12 for actuation by the thumbs of the user. Cursor control devices 82 may comprise, for example, a conventional thumball and a thumball actuator, or equivalents thereof, as illustrated. Referring now to FIG. 13, those keys on the top surface of the keypads 10, 12 that are illustrated as squares are intended to be actuated by the user's fingers and those illustrated as circles are intended to be actuated by the user's thumbs. A keyboard layout that includes alphabetic, numeric, and function keys and that is not of the conventional QWERTY type is illustrated in FIG. 13.

Figure 14:
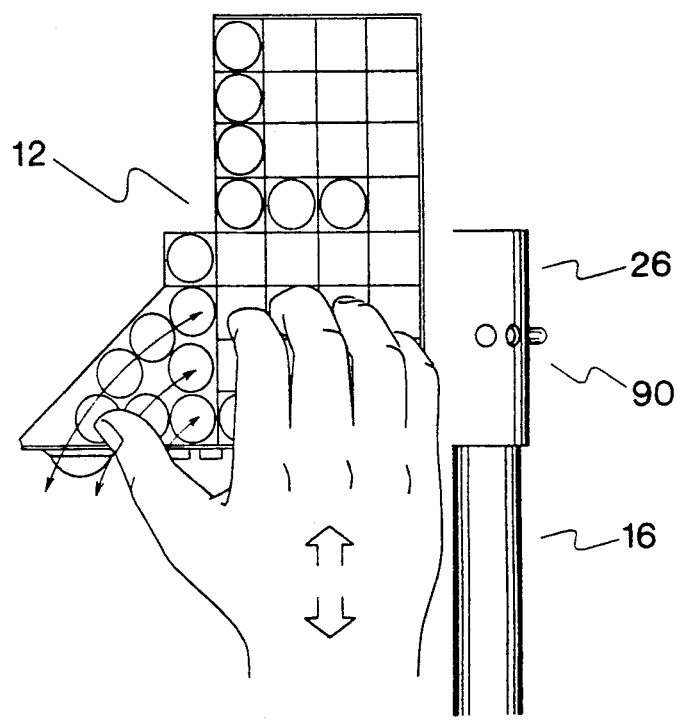
FIG. 14 is a plan view of the right keypad of FIG. 5 in an armrest application illustrating the position of the user's right hand when it is in a home position on the keyboard.
Figure 15:
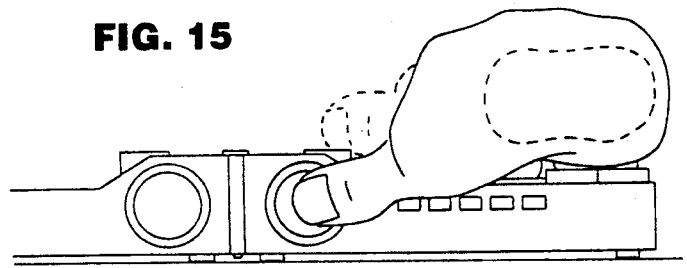
FIG. 15 is an elevation view of the joined keypads of FIGS. 11-13 illustrating the way in which the user's thumb is positioned to actuate the additional keys and control devices mounted on the front vertical faces of the keypads.
Figure 16:
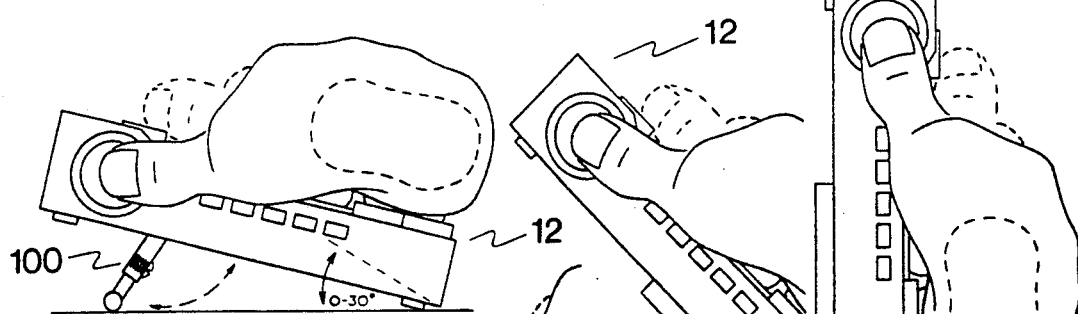
FIG. 16 is an elevation view of the right keypad of FIG. 4 illustrating the way in which the keypad may be adjustably tilted from a horizontal position on a desktop by means of a retractable leg mounted on the underside of the keypad.
Figure 17:
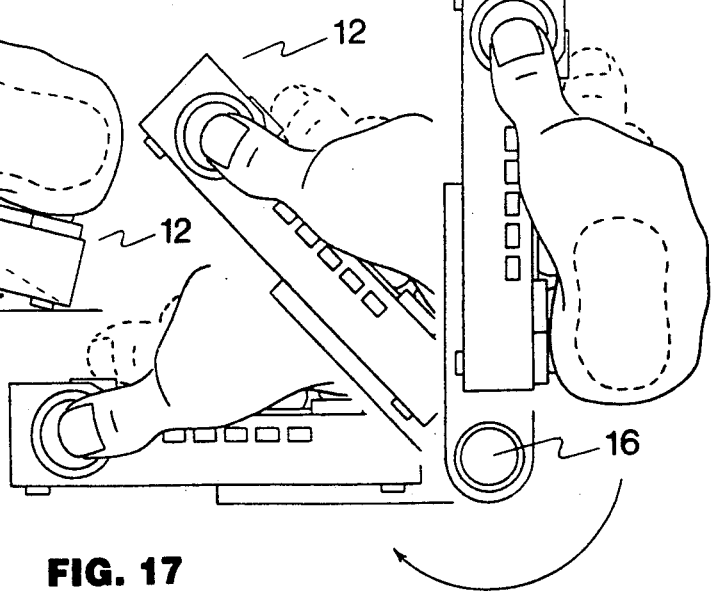
FIG. 17 is an elevation view of the right keypad of FIG. 5 in an armrest application illustrating the way in which the keypad may be rotated on a keypad support arm between horizontal and vertical positions.

Referring now to FIGS. 14 and 17, the right keypad 12 is illustrated in an armrest application. The motion of the user's thumb, fingers, and hands from the home position that is required to actuate the various keys on the top surface of the keypad, as well as those on the vertical front surface of keypad 12, is illustrated in FIG. 14. As shown in FIG. 17, keypad 12 may be rotated with respect to the axis of keypad support arm 16 to any position between the horizontal and vertical positions. A conventional spring-loaded button is provided on armrest adaptor 26 for locking the desired rotational position of keypad 12. The way in which the user's thumb is moved in order to actuate both the keys on the vertical front surface of the keypads 10, 12 and certain ones of the keys on the top surface of the keypads is illustrated in FIG. 15. FIG. 16 illustrates the way in which the keypads 10, 12 may be tilted from the horizontal when separately positioned on a desktop. An adjustable, retractable leg 100 mounted on the underside of each of the keypads 10, 12 is employed to adjust the tilt angle of the keypads to any desired position up to approximately thirty degrees from the horizontal.

I claim:

1. Left and right keypads adapted for operation by a user's left and right hands, respectively, said left keypad comprising a square section having a top surface on which a square matrix of four rows and four columns of keys in direct alignment with each other is positioned primarily for actuation by the fingers of the user's left hand, said left keypad further comprising a rightward pointed trapezoidal protrusion, adjacent to and frontally aligned with said square section, having a top surface on which a plurality of keys are radially positioned in a fan shape for actuation by the thumb of the user's left hand, said left keypad further comprising a vertical front planar surface, formed by aligned and contiguous front planar surfaces of said square section and said rightward pointed trapezoidal protrusion, on which a plurality of elements, including one or more cursor control elements, are linearly positioned, also for actuation by the thumb of the user's left hand, said right keypad comprising a first square section having a top surface on which a first square matrix of four rows and four columns of keys in direct alignment with each other is positioned primarily for actuation by the fingers of the user's right hand, said right keypad further comprising a leftward pointed trapezoidal protrusion, adjacent to and frontally aligned with said first square section, having a top surface on which a plurality of keys are radially positioned in a fan shape for actuation by the thumb of the user's right hand, said right keypad further comprising a second square section aligned directly rearward of and abutting said first square section and having a top surface on which a second square matrix of four rows and four columns of keys, in direct alignment with each other and with the corresponding rows and columns of said first square section, is positioned for actuation by the fingers and thumb of the user's right hand, said right keypad further comprising a vertical front planar surface, formed by aligned and contiguous front planar surfaces of said first square section and said leftward pointed trapezoidal protrusion, on which a plurality of elements, including one or more cursor control elements, are linearly positioned, also for actuation by the thumb of the user's right hand, said left and right keypads forming an interlocking square diamond-shaped unitary keyboard when joined together.

2. Left and right keypads as in claim 1 in which various ones of the plurality of keys positioned on the top surface of each of said leftward pointed and rightward pointed trapezoidal protrusions are positioned at different planar heights to avoid striking more than one thumb-operated key at a time, and in which various ones of the square matrix of keys of said left keypad and various ones of the first and second square matrices of keys of said right keypad are positioned at different planar heights to establish a home position easily recognized by the fingers of the user's hands.

3. Left and right keypads as in claim 1 further comprising a vertically mounted hinge coupled to said left and right keypads at inward points of said leftward pointed protrusion and said rightward pointed protrusion for joining said left and right keypads and for permitting pivotal motion of said left and right keypads in the horizontal plane such that said left and right keypads may be adjusted to any position between an open position and a closed position, said left and right keypads forming said interlocking square diamond-shaped unitary keyboard when in said closed position.

4. Left and right keypads as in claim 1 further comprising left and right frame members mounted to a user's chair, said left and right frame members adjustably and pivotally supporting left and right armrests having sliding armrest pads for supporting the left and right forearms of the user, respectively, said left and right frame members further adjustably and pivotally supporting left and right keypad support arms, sharing a common pivot point with said left and right armrests, for receiving said left and right keypads, respectively, and for supporting said left and right keypads forward of said left and right sliding armrest pads for operation by the user's hands, said left and right sliding armrest pads being arranged for adjustment in forward and rearward directions atop the armrests, and said left and right keypads being arranged for rotation about said left and right keypad support arms to any desired position between a horizontal position and a vertical position and being further arranged for retraction downward to an out of the way position when not in use.

5. Left and right keypads as in claim 1 further comprising a chair adaptor assembly consisting of pairs of armrest adaptors, mounting plates, vertical frame members, positioning devices, armrest support members, keypad support arms, and armrests;

said pair of armrest adaptors being arranged in mirror image of each other, each comprising a plate mounted to an underside of a respective one of said left and right keypads and a tubular sleeve attached on one side capable of sliding over and being rotatably positioned and attached to said pair of keypad support arms;

said pair of mounting plates being arranged in mirror image of each other and being mounted to each side of an underside of a chair seat, each of said pair of mounting plates having a sleeve affixed to an underside of said chair seat, said sleeves being parallel and pointing to a rear of said chair seat, each of said sleeves being adapted for adjustably retaining one of said pair of vertical frame members;

said pair of vertical frame members being arranged in mirror image of each other to form an inverted U when joined together, each of said pair of vertical frame members having an end bent at an angle for insertion into said mounting plates, said pair of vertical frame members serving to provide a brace in the back of a chair on which the pairs of positioning devices, armrest support members, keypad support arms, and armrests are attached, said pair of vertical frame members adjustable and pivotally supporting said pair of armrests;

said pair of positioning devices comprising a pair of sliding sleeves adapted for being adjustably positioned around each of said pair of vertical frame members to serve as mounting brackets for said pair of armrest support arms and said pair of keypad support arms, said pair of sliding sleeves comprising first and second sections of tubing for receiving said pair of keypad support arms and said pair of armrest support members, said pair of sliding sleeves providing support and height adjustment for said pair of armrests;

said pair of armrest support members each comprising a flat bar, from one end of which a perpendicularly positioned section of tubing extends and from the opposite end of which a perpendicular locking bolt is inserted into a slot on a side of each of said pair of armrests for providing support and height adjustment of said pair of armrests;

said pair of keypad support arms being arranged in mirror image of each other and being adapted for insertion into an upper sliding sleeve on each side of said pair of vertical support members;

said pair of armrests being arranged in mirror image of each other and each comprising a hollowed rectangular box having a horizontal tubular sleeve affixed to a rear end into which a respective one of said pair of keypad support arms is inserted, each of said pair of armrests having a bearing surface on a top thereof and a longitudinal slot therein, said bearing surface receiving a flat forward and rearward sliding armrest pad having a flared downward fin extending the length of said armrest, said fin being retained in said longitudinal slot, each of said pair of armrest pads being arranged for adjustment in forward and rearward directions, each of said pair of armrests also containing a slot midway along an inward side into which a respective one of said pair of armrest support members is adjustably attached, said pair of armrests being adapted for retaining a plurality of control devices for controlling the positioning of said pair of keyboard support arms and said pair of keypads;

said pair of keypads being attached to and arranged for rotation about respective ones of said pair of keypad support arms to any desired position between a horizontal position and a vertical position and being further arranged for retraction downward to a stowed position when not in use.

6. Left and right keypads as in claim 1 further comprising an adjustable, retractable leg positioned on a bottom surface of said left and right keypads for adjusting a tilt angle from the horizontal of each of said left and right keypads.

* * * * *